US012753353B1

(12) United States Patent
Bauman

(10) Patent No.: US 12,753,353 B1

(45) Date of Patent: Oct. 6, 2026

(54) LIQUEFACTION PROCESS

(71) Applicant: Richard Bauman, Bellingham, WA (US)

(72) Inventor: Richard Bauman, Bellingham, WA (US)

( * ) Notice: Subject to any disclaimer, the term of this patent is extended or adjusted under 35 U.S.C. 154(b) by 0 days.

(21) Appl. No.: 19/428,220

(22) Filed: Dec. 21, 2025

(51) Int. Cl.

| | |
|---|---|
| ***C10G 67/02*** | (2006.01) |
| ***B01D 53/62*** | (2006.01) |
| ***B01D 53/84*** | (2006.01) |
| ***C01B 3/12*** | (2006.01) |
| ***C01B 3/34*** | (2006.01) |
| ***C10G 1/00*** | (2006.01) |
| ***C10G 1/06*** | (2006.01) |
| ***C10G 1/08*** | (2006.01) |
| ***C10G 45/02*** | (2006.01) |
| ***C10G 45/44*** | (2006.01) |
| ***C10J 3/82*** | (2006.01) |
| ***C22B 34/34*** | (2006.01) |
| ***C22B 41/00*** | (2006.01) |
| ***C22B 59/00*** | (2006.01) |

(52) U.S. Cl.

CPC ............ *C10G 67/02* (2013.01); *B01D 53/62* (2013.01); *B01D 53/84* (2013.01); *C01B 3/12* (2013.01); *C01B 3/34* (2013.01); *C10G 1/002* (2013.01); *C10G 1/006* (2013.01); *C10G 1/06* (2013.01); *C10G 1/083* (2013.01); *C10G 45/02* (2013.01); *C10G 45/44* (2013.01); *C10J 3/82* (2013.01); *C22B 34/34* (2013.01); *C22B 41/00* (2013.01); *C22B 59/00* (2013.01); *B01D 2257/504* (2013.01); *C01B 2203/0233* (2013.01); *C01B 2203/0283* (2013.01); *C01B 2203/062* (2013.01); *C01B 2203/065* (2013.01); *C01B 2203/0811* (2013.01); *C01B 2203/1241* (2013.01); *C01B 2203/84* (2013.01); *C10G 2300/301* (2013.01); *C10G 2400/04* (2013.01); *C10G 2400/08* (2013.01); *C10J 2300/093* (2013.01); *C10J 2300/1618* (2013.01); *C10J 2300/1643* (2013.01); *C10J 2300/1659* (2013.01)

(58) Field of Classification Search

CPC .......... C10G 2/32; C10G 1/042; C10G 45/58; C10G 2300/1022; C10G 2400/04; C05F 5/00; C05F 11/00; Y02A 40/20

See application file for complete search history.

(56) References Cited

U.S. PATENT DOCUMENTS

| | | | |
|---|---|---|---|
| 4,089,773 | A | 5/1978 | Espenscheid |
| 4,397,732 | A | 8/1983 | Hoover et al. |
| 4,594,140 | A | 6/1986 | Cheng |

(Continued)

FOREIGN PATENT DOCUMENTS

| | | | |
|---|---|---|---|
| EP | 00 0 7 1 7 4 | A1 | 1/1980 |
| WO | WO 2008/083601 | | 12/2006 |
| WO | WO 2008/083600 | A1 | 7/2008 |

OTHER PUBLICATIONS

The Hybrid Plant Concept—Combining Direct and Indirect Coal Liquefaction Processes (1).

*Primary Examiner* — In Suk C Bullock
*Assistant Examiner* — Jason Y Chong

(57) ABSTRACT

A hybrid carbonaceous feed liquefaction process comprising an indirect conversion process and direct conversion and upgrading process is provided that provides for increased capacity and other advantages.

47 Claims, 8 Drawing Sheets

Low Investment Case

(56) References Cited

U.S. PATENT DOCUMENTS

| | | | | |
|---|---|---|---|---|
| 4,643,110 | A | | 2/1987 | Epstein et al. |
| 4,874,506 | A | | 10/1989 | Comolli et al. |
| 5,198,099 | A | | 3/1993 | Lasko et al. |
| 8,735,111 | B2 | | 5/2014 | El Tahchy et al. |
| 8,784,650 | B2 | | 7/2014 | Huang et al. |
| 8,916,043 | B2 | | 12/2014 | Charon et al. |
| 9,163,180 | B2 | | 10/2015 | Marion et al. |
| 9,234,139 | B2 | | 1/2016 | Trachte et al. |
| 9,353,325 | B2 | | 5/2016 | Denton et al. |
| 9,994,778 | B2 | | 6/2018 | O'Connor et al. |
| 11,466,217 | B2 | | 10/2022 | Chauhan et al. |
| 2009/0286889 | A1 | * | 11/2009 | Fiato .................. C07C 29/1518 518/700 |
| 2010/0285576 | A1 | | 11/2010 | Norbeck |
| 2011/0290703 | A1 | | 12/2011 | Colyar |
| 2012/0036764 | A1 | | 2/2012 | Babe et al. |
| 2012/0144887 | A1 | | 6/2012 | Bisio et al. |
| 2014/0262965 | A1 | | 9/2014 | Trachite et al. |
| 2014/0296595 | A1 | | 10/2014 | Trachite et al. |
| 2014/0346030 | A1 | | 11/2014 | Livneh |
| 2014/0371496 | A1 | | 12/2014 | Spindler et al. |
| 2015/0083570 | A1 | | 3/2015 | Stiller et al. |
| 2015/0191657 | A1 | | 7/2015 | Bauman et al. |
| 2016/0340591 | A1 | | 11/2016 | Bauman |
| 2016/0340592 | A1 | | 11/2016 | O'Connor et al. |
| 2025/0207041 | A1 | | 6/2025 | Liu et al. |

* cited by examiner

Low Investment Case

Increased Capacity Case

Greater Fuels Capacity

Maximum Fuels Capacity

Low $CO_2$ Emissions Case

Eliminate Slurry Preheat Furnace
Purge Gas to Upgrading or Fuel Gas
C3/C4
C5/650°F to Upgrading
Bottoms
VPS
APS
Separation
Slurry Mix Tank
Slurry Pump
Recycle Compressor
H2 Quench
Liquefaction Reactors
Coal
Catalyst
H2 Furnace
Make-Up Hydrogen
701
702
703
704
705
706
707
708
709
710
711
712
713
714
715
716
717
718
719
720
721
722

LIQUEFACTION PROCESS

BACKGROUND OF THE INVENTION

All patents, patent applications and other publications referred to herein are specifically incorporated herein by reference in their entirety.

BACKGROUND

The 2023 energy reserves in the U.S. and Alberta reported by the U.S. Energy Information Administration are:

Natural Gas 603.6 trillion cubic feet
Crude Oil and lease condensate 46.4 billion barrels
Heavy Oil (bitumen) 165 billion barrels
Coal 469 billion short tons If converted to liquid fuels only, the quantity of fuels would be:

Natural Gas 63.2 billion barrels
Crude Oil 49.7 billion barrels
Heavy Oil (bitumen) 108.9 billion barrels
Coal
 Direct Coal Liquefaction (DCL) 750 billion barrels
 Indirect Coal Liquefaction (ICL) 500 billion barrels Natural gas will also be exported and utilized for power generation; thus, the number of barrels would be significantly less.

Based on the Chevron project in Nigeria, it is estimated that the conversion of 325 million cubic feet of natural gas per day will produce 34 thousand barrels per stream day (KB/SD) of synfuel. Final cost of the plant in 2014 was $10 billion. $CO_2$ produced in the plant is estimated to be 1.2 tons of CO2 per ton of products.

The rough cost for a 50 KB/SD to 200 KB/SD refinery in 2021 is estimated to be $2 billion to $10 billion. In the U.S. in 2021, refineries accounted for 198 million annual tons of $CO_2$ or 13% of U.S. emissions. As of Jan. 1, 2025, the operable atmospheric pipe still capacity was 18.4 million barrels per calendar day or approximately 10.8 tons of $CO_2$ per barrel.

The cost to refine a barrel of bitumen varies significantly by product, but for a new, large-scale bitumen refinery, the cost of building it can be around $60,000 to $120,000 per barrel of capacity; thus, the cost of a 50 KB/SD could be as low as $6 billion and as high as $12 billion for 200 KB/SD. Operating costs for bitumen processing range from approximately $10 to over $60 per barrel. A 2025 Eurobitume study reported a Global Warming potential of 0.53 tons of $CO_2$ per ton of refined bitumen.

Coal to Fuels via the Indirect Liquefaction Process (i.e., Fischer-Tropsch (F-T) process) involves converting carbonaceous feeds into syngas (a mixture of carbon monoxide and hydrogen) through gasification, shift conversion, and $CO_2$ removal, then reacting the syngas with a catalyst (typically iron or cobalt) to produce synthetic liquid fuels like diesel. This Coal to Liquids technology (CTL) was commercialized by Sasol in South Africa but faces challenges including high costs and lower efficiency compared to natural gas-based processes. The products from the process are highly paraffinic with excellent combustion properties but have low specific gravity (low volumetric energy content) and limited flow properties.

Coal to Fuels via Direct Coal Liquefaction (DCL) involves hydrogenating carbonaceous feeds to produce raw aromatic liquids which contain high levels of oxygen, sulfur, and nitrogen. DCL processes are generally known in the art as disclosed, for example in US20140262965, US20170321125, U.S. Pat. No. 5,198,099, US20160340591, US20160340592, US20140296595 and US20150191657, all incorporated herein by reference in their entirety. DCL converts carbonaceous feedstock directly into liquids by reaction with hydrogen at high temperatures and pressures in the presence of a solvent and catalyst. These liquids are subsequently hydrocracked to produce sulfur free LPG, gasoline, jet fuel, and diesel fuel. Typically, the DCL process produces approximately 50% more liquid product than the Fischer-Tropsch process largely due to the reduced amount of feed such as coal that must be converted at lower thermal efficiency to hydrogen or synthesis gas. Unlike the Fischer-Tropsch process, the product is highly naphthenic. These molecules have high specific gravity (high volumetric energy content) and low Cloud or Freeze point and are thus excellent for use as Arctic diesel or jet fuel. Jet planes can operate for longer periods of time and at high altitude. Combustion properties meet conventional specifications but are poorer than Fischer-Tropsch liquids.

Hybrid Processes have been proposed. These processes combine Indirect Coal Liquefaction (F-T or CTL) and Direct Coal Liquefaction into a single overall process. The blended combination of paraffinic and naphthenic moles from the two processes allows production of fuels that have properties that are typically produced by refineries including gasoline or where a higher Cetane number diesel is required, where Cetane number is the diesel equivalent of octane for gasoline.

A Hybrid process has been proposed that consists of an Indirect Coal Liquefaction stage followed by a Direct Coal Liquefaction stage. In the Indirect Coal Liquefaction stage, coal is gasified to produce syngas comprising $H_2$, CO, and $CO_2$ plus impurities. The syngas is fed to a F-T step wherein carbon monoxide and hydrogen are consumed in a once-through Fischer-Tropsch stage with the residual hydrogen rich gas flowing to the DCL stage. Product from the process was a mix of paraffins and naphthenes that had properties similar to those typically produced from refineries.

Bauman patented a Hybrid process that combined a Direct Liquefaction (DCL) stage followed by an Indirect Coal Liquifaction stage (U.S. Pat. No. 9,234,139). The unconverted coal from the DCL stage was gasified to produce syngas for the synthesis stage.

Ongoing research has focused on (1) reducing or eliminating $CO_2$ emissions from the coal conversion process per barrel of product, (2) reducing plant investment, (3) producing a high yield of zero sulfur diesel and/or jet fuel, and (4) producing a jet fuel and diesel fuel that can be used as a arctic diesel fuel or high-performance high-density jet fuel.

According to an embodiment, a process comprises:

a. modifying an indirect conversion process that comprises a syngas generation step and a product synthesis step by eliminating the product synthesis step;
b. feeding first carbonaceous feed to the syngas generation step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process.

In the context of standard stand-alone CTL, DCL and proposed hybrid plants, eliminating the product synthesis (e.g., Fischer-Tropsch) step in an Indirect Liquefaction plant and, instead feeding a hydrogen-rich stream therefrom to a DCL plant was found to have a number of unexpected and surprising operating efficiencies and advantages as will become clear from this disclosure.

According to another embodiment, a process comprises:

a. modifying an indirect conversion process that comprises a syngas generation step and a product synthesis step by eliminating the product synthesis step;
b. feeding first carbonaceous feed to the syngas generation step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein the direct conversion process produces an aromatic liquid product comprising heteroatoms of S, N, and O.

According to a further embodiment, a process comprises:

a. modifying an indirect conversion process that comprises a gasification step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein the direct conversion process produces an aromatic liquid product comprising heteroatoms of S, N, and O, wherein the direct conversion and upgrading process is a direct liquefaction process comprising a liquefaction reactor system, wherein the liquefaction reactor system comprises plural reactor stages, wherein effluent from the liquefaction reactor system is fed to an upgrading reactor system wherein heteroatoms are removed, final boiling point is adjusted and aromatics are hydrogenated to naphthenes.

According to another embodiment, a process comprises:

a. modifying an indirect conversion process that comprises a syngas generation step and a product synthesis step by eliminating the product synthesis step;
b. feeding first carbonaceous feed to the syngas generation step of the indirect conversion process wherein it is converted into syngas that comprises H2 and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein the direct conversion process produces an aromatic liquid product comprising heteroatoms of S, N, and O, wherein the liquid product is fed to an upgrading reactor system wherein it is reacted with a hydrogen-rich feedstream in a reactor system comprising multiple fixed bed reactors containing hydrotreating or hydrocracking catalyst, wherein a first fixed bed reactor converts the heteroatoms of S, N, and O into $H_2S$, $H_2O$, and $NH_3$ which are fed to a second reactor to remove any residual S, O, and N compounds and partially convert aromatic compounds to naphthenes, wherein effluent from the second reactor enters a fractionator where $H_2S$, $H_2O$, $NH_3$, LPG, and naphtha are separated from the second stage effluent, wherein material boiling above naphtha is hydrogenated in a third reactor where aromatics are converted to naphthenes which meet diesel and jet fuel specifications or naphtha rich in naphthenes and aromatics.

DETAILED DESCRIPTION OF THE INVENTION

Figure 1:
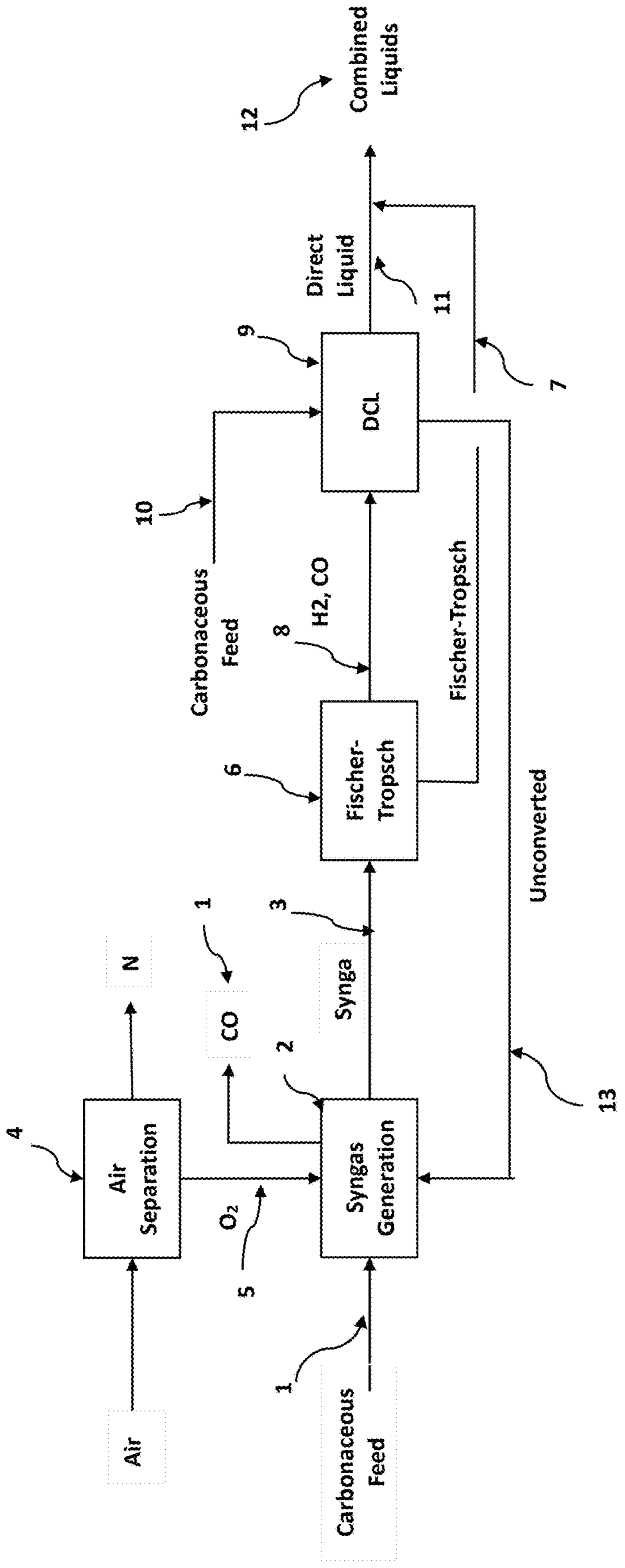
Figure 1 Prior Art
FIG. 1 is a schematic diagram of a proposed prior art hybrid system that includes an Indirect Liquefaction process that includes a Fischer-Tropsch step followed by a Direct Liquefaction process.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

All publications, patents and patent applications cited herein, whether supra or infra, are hereby incorporated herein by reference in their entirety to the same extent as if each individual publication, patent or patent application was specifically and individually indicated to be incorporated herein by reference. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, as well as, any range formed within a specified range, regardless of whether ranges are separately disclosed. Where a range of numerical values is recited herein, unless otherwise stated, the range is intended to include the endpoints thereof, and all integers and fractions within the range. For example, recitation of 1-5 is intended to include all integers including and between 1 and 5 and all fractions and decimals between 1 and 5, e.g., 1, 1.1, 1.2, 1.3 etc. It is not intended that the scope of the invention be limited to the specific values recited when defining a specific range. Similarly, recitation of at least about or up to about a number is intended to include that number and all integers, fractions and decimals greater than or up to that number as indicated. For example, at least 5 is intended to include 5 and all fractions and decimals above 5, e.g., 5.1, 5.2, 5.3 etc.

It is noted that, as used in this specification and the appended claims, the singular forms "a," "an" and "the"

include plural referents unless the content clearly dictates otherwise. Unless otherwise expressly indicated herein, all amounts are based on volume.

With reference to the drawings in which like reference numerals are used to indicate like elements, FIG. 1 is a schematic diagram of a proposed prior art hybrid system that includes an Indirect Liquefaction Process (CTL) that includes a Fischer-Tropsch ("F-T") step followed by a Direct Liquefaction Process. Numeral 1 is carbonaceous feed to syngas generation (e.g., gasifier) 2 for generating synthesis gas (syngas) 3. The exact composition of syngas can vary significantly depending on the feedstock and the syngas generation process involved; however typically syngas is 30 to 60% carbon monoxide (CO), 25 to 30% hydrogen ($H_2$), 0 to 5% methane ($CH_4$), 5 to 15% carbon dioxide ($CO_2$), plus a lesser or greater amount of water vapor, smaller amounts of the sulfur compounds hydrogen sulfide ($H_2S$), carbonyl sulfide (COS), and finally some nitrogen and other trace contaminants. Air separator 4 generates high purity oxygen 5 fed to syngas generator 2 for reaction with carbonaceous feed 1. It is well known that carbonaceous feed can be converted into a gaseous mixture of predominantly CO and Hz in varying ratios depending on the type of carbonaceous fuel.

Following contaminant and $CO_2$ removal (not shown), syngas 3 rich in $H_2$ and CO is fed to Fischer-Tropsch process 6 wherein Fischer-Tropsch liquid products 7 are formed. Stream 8, containing unreacted $H_2$ and CO from the Fischer-Tropsch process 6 are then fed as reactants to Direct Liquefaction Process (DCL) 9, wherein the $H_2$ and CO are reacted with carbonaceous feed 10 at high temperature and pressure in the presence of solvent and catalyst to produce direct liquid product(s) 11 that are combined with the Fischer-Tropsch liquids 7 to make a desired final product. As shown in FIG. 1, unconverted bottoms 13 from the DCL are recycled to syngas generator 2.

According to an embodiment, a process comprises:

a. modifying an indirect conversion process that comprises a syngas generation step and a product synthesis step by eliminating the product synthesis step;

b. feeding first carbonaceous feed to the syngas generation step of the indirect conversion process wherein it is converted into syngas that comprises $H_2$ and additionally at least one of $N_2$, $CO_2$ and CO;

c. treating the syngas to produce a hydrogen-rich feedstream by increasing the hydrogen content thereof; and d. feeding the hydrogen-rich feedstream as feed to a direct conversion and upgrading process.

According to another embodiment, a process comprises:

a. modifying an indirect conversion process that comprises a syngas generation step and a product synthesis step by eliminating the product synthesis step;

b. feeding first carbonaceous feed to the syngas generation step of the indirect conversion process wherein it is converted into syngas that comprises $H_2$ and additionally at least one of $N_2$, $CO_2$ and CO;

c. treating the syngas to produce a hydrogen-rich feedstream by increasing the hydrogen content thereof; and d. feeding the hydrogen-rich feedstream as feed to a direct conversion and upgrading process, wherein the direct conversion and upgrading process is a direct liquefaction process comprising a liquefaction reactor system, wherein additional carbonaceous feed is reacted with the hydrogen-rich feedstream and catalyst to produce a liquefaction effluent that comprises heteroatoms of S, $N_2$, and O, wherein the liquefaction reactor system comprises plural reactors, and wherein the liquefaction effluent is treated to remove heteroatoms therefrom, hydrogenate aromatics to naphthenes and adjust the final boiling point of the remaining product.

According to a further embodiment, a process comprises:

a. modifying an indirect conversion process that comprises a syngas generation step and a product synthesis step by eliminating the product synthesis step;

b. feeding first carbonaceous feed to the syngas generation step of the indirect conversion process wherein it is converted into syngas that comprises H2 and additionally at least one of $N_2$, $CO_2$ and CO;

c. treating the syngas to produce a hydrogen-rich feedstream by increasing the hydrogen content thereof; and d. feeding the hydrogen-rich feedstream as feed to a direct conversion and upgrading process, wherein the direct conversion process produces an aromatic liquid product that comprises heteroatoms of S, N, and O, wherein the aromatic liquid product is reacted with a hydrogen-rich feedstream in a reactor system comprising multiple fixed bed reactors containing hydrotreating or hydrocracking catalyst, wherein a first fixed bed reactor converts the heteroatoms of S, N, and O into $H_2S$, $H_2O$, and $NH_3$ which are fed to a second reactor to remove any residual S, O, and N compounds and partially convert aromatic compounds to naphthenes, wherein effluent from the second reactor enters a fractionator where $H_2S$, $H_2O$, $NH_3$, LPG, and naphtha are separated from the second stage effluent, wherein material boiling above naphtha is hydrogenated in a third reactor where aromatics are converted to naphthenes which meet diesel and jet fuel specifications or naphtha rich in naphthenes and aromatics.

Producing a hydrogen-rich stream is understood to mean increasing the amount of hydrogen relative to the CO content of the syngas stream.

There are many fossil fuels which may be used as the carbonaceous feed, including biomass (for example, algae), solid fuels such as anthracite, brown coal, bituminous coal, sub-bituminous coal, lignite, petroleum coke, peat and the like, and heavy residues, e.g. hydrocarbons extracted from tar sands, residues from refineries such as residual oil fractions boiling above 360° C., directly derived from crude oil, or from oil conversion processes such as thermal cracking, catalytic cracking, hydrocracking etc. All such types of fuels have different proportions of carbon and hydrogen, as well as different substances regarded as contaminants. While the embodiments are sometimes described herein in terms of treating "coal", it should be understood that those descriptions are intended to be applicable and to include the fossil fuels described above.

There are several known methods for generating syngas, including steam methane reforming, autothermal reforming, partial oxidation, methane dry reforming and aqueous phase reforming, and gasification. Steam methane reforming reacts methane from natural gas and steam over a catalyst. Autothermal reforming is typically useful for reforming hydrocarbons like natural gas, combines partial oxidation and steam reforming. Partial oxidation reacts natural gas with a limited amount of oxygen at high temperatures to provide less than complete combustion. Methane dry reforming reacts greenhouse gases methane and carbon dioxide (instead of steam) at high temperatures over catalyst. Aqueous phase reforming uses a heterogeneous catalyst to convert organic compounds in water at low temperature and pressure. In a gasification process, carbonaceous fuel, water and high purity oxygen are reacted in a partial oxidation reaction to produce syngas. The partial oxidation reaction in the gasifier is exothermic proceeding forward at a high temperature of about 1,400° C. and a high pressure of about 1,000 psig. Contaminants in the carbonaceous fuels, such as oxygen, nitrogen, mercury, and sulfur, can be subsequently removed from the syngas before further use in either a chemical conversion process or a power conversion process. Elemental mercury can be removed, for example, in an activated carbon adsorption bed, and sulfur containing acid gas such as $H_2S$, produced in the gasifier, can be removed in an Acid Gas Removal (AGR) solvent absorption unit. If $C0_2$ capture is desired, the syngas can be further processed with steam in a Water Gas Shift (WGS) reactor to form a shift gas. The resultant shift gas is predominantly $H_2$ and $CO_2$, plus additional $H_2$ from the water. The $C0_2$ can then be absorbed with a solvent, removed, and then stripped from the solvent with steam. The high purity $C0_2$ extracted in the solvent absorption steam stripper can be compressed and pumped to a geologic sequestration site.

Figure 2:
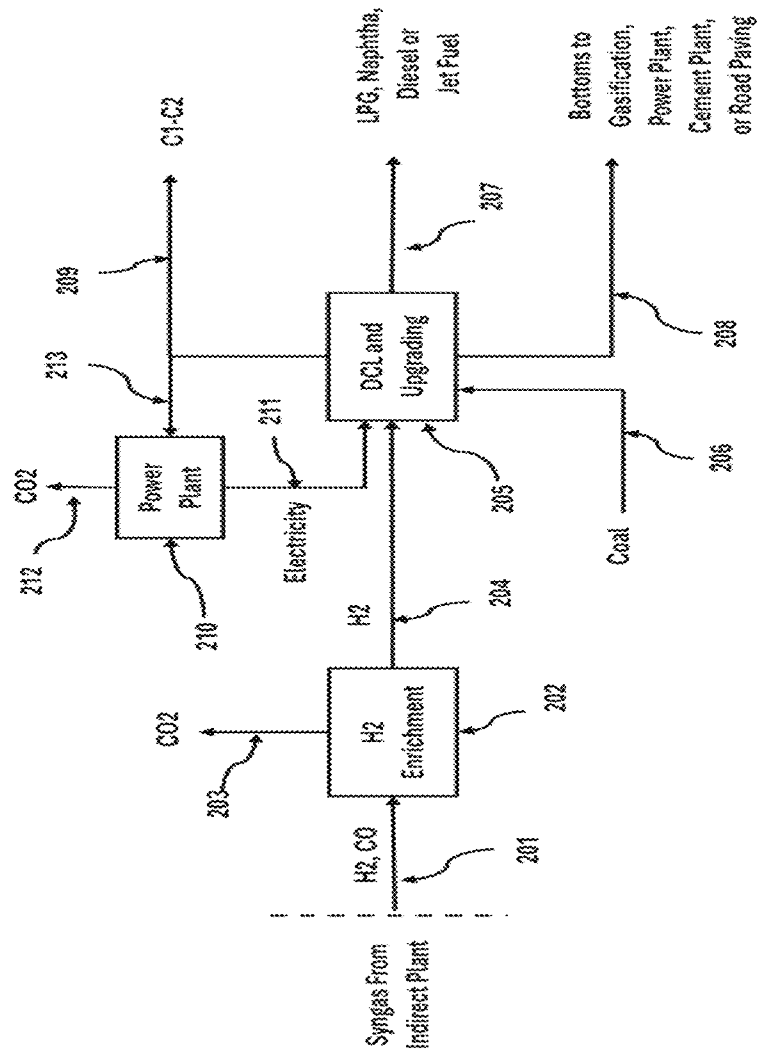
FIG. 2 is a schematic diagram of an alternative embodiment that allows for reduced plant investment.

As shown at 202 in FIG. 2, the syngas 201 from the Indirect Process syngas generator (not shown) is treated to increase the $H_2$ content thereof (hydrogen enrichment) by any known method such as, by way of nonlimiting example, water-gas shift reaction with $CO_2$ scrubbing or pressure swing adsorption. This produces a hydrogen-rich stream 204 (as contrasted with the hydrogen- and carbon monoxide-rich stream of FIG. 1) which is fed to the reactor system of DCL and upgrading 205. Coal (carbonaceous) feed 206 is also fed to the reactor system (not shown) of the DCL and upgrading wherein it is reacted with hydrogen 204, solvent and catalyst to produce liquid effluent for upgrading to desired products (not shown). By way of illustration the DCL liquefaction reactor system 205 comprises plural reactor stages. Effluent from the reactor system is fractionated into an overhead stream, an LPG, Naphtha, diesel or jet fuel stream 207, and a bottoms stream 208 containing ash and unconverted coal. The DCL and upgrading produces $C_1$-$C_2$ light gas which is split into a first product recovery stream 209 and a feed stream 213 to power generation 210 which produces electricity 211. Bottoms 208 from the DCL and upgrading can be sent to gasification for production of syngas, blended with coal to a power plant, fuel for a cement plant, or used for road paving. Using effluent C1-C2 for power generation avoids the investment for equipment required to use coal to generate power. $CO_2$ emissions can be captured and sequestered.

The quantity of hydrogen and hence the quantity of product from the invention is only proportional to the product rate and is independent of the feed to the indirect process. The thermal efficiency, feedstock required for the indirect process, and the $CO_2$ produced varies with feedstock. For instance, the thermal efficiency for an ammonia plant will increase from 44.4 percent for a plant feeding coal to 66.6 percent for a plant with natural gas as the feedstock and tons of $CO_2$ per ton of ammonia will decrease from 3.8 to 1.6.

In the example presented in Table 2, the quantity of $CO_2$ produced in the F-T plant and the Btu's of feed required will decrease for a shift from coal to natural gas and decrease from the DCL plant.

According to another embodiment a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process to produce liquids, wherein the direct conversion and upgrading process also produces $C_1$-$C_2$ byproduct which is fed to a steam methane reformer to produce hydrogen and wherein the hydrogen produced in the steam methane reformer is recycled as feed to the direct conversion and upgrading process.

Figure 3:
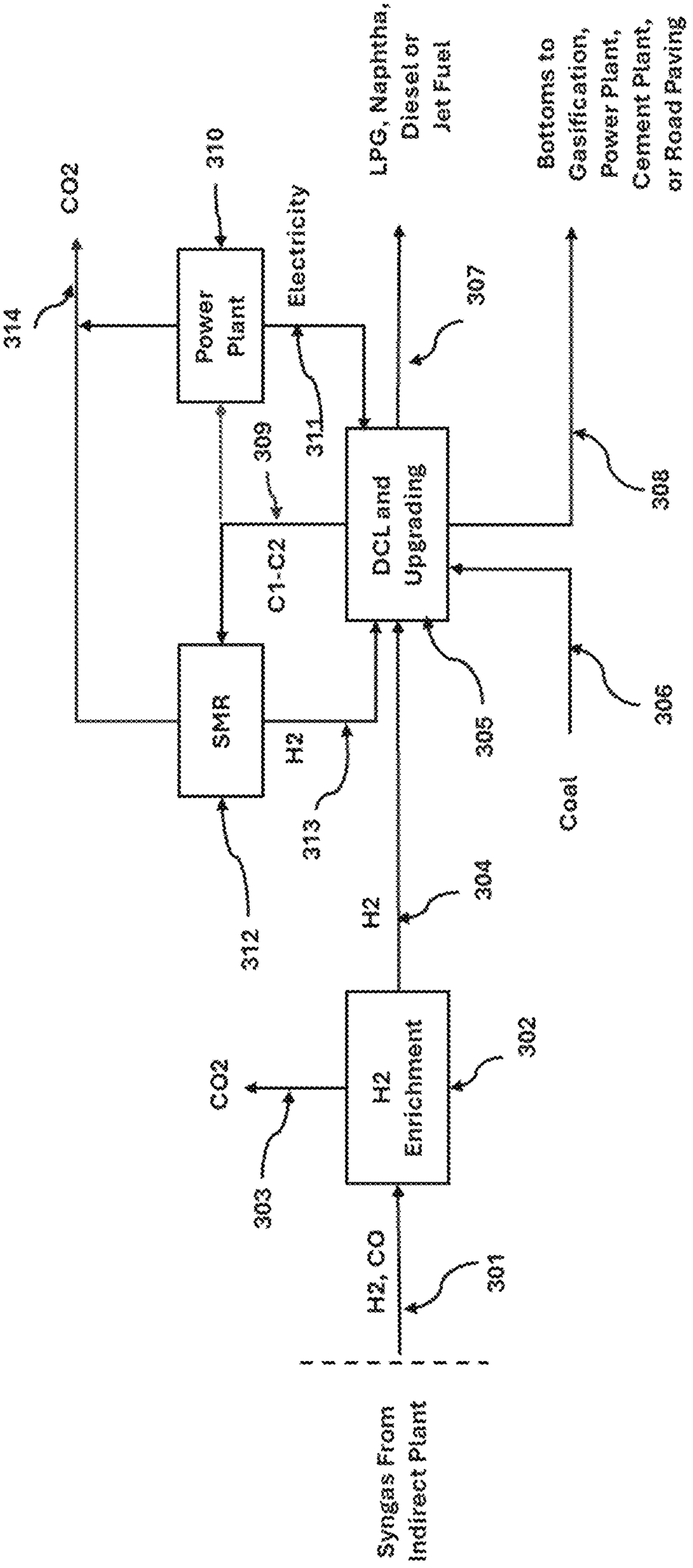
FIG. 3 is a schematic diagram of an alternative embodiment that allows for increased plant output.

As shown at 301 in FIG. 3, syngas from the syngas generator of the Indirect Process is treated to increase the $H_2$ content thereof (hydrogen enrichment) 302. This produces a hydrogen-rich stream 304 which is fed to the DCL and upgrading system 305. Coal feed 306 is also fed to the DCL and upgrading system (not shown) of the DCL and upgrading wherein it is reacted with hydrogen 304 and 313, solvent and catalyst to produce liquid effluent for upgrading (not shown) to desired products. The DCL and upgrading system produces $C_1$-$C_2$ gases 309; LPG, Naphtha, diesel or jet fuel 307 and bottoms stream 308. Part of the $C_1$-$C_2$ is fed to a steam methane reformer (SMR) 312 for conversion to $H_2$. The remainder of the $C_1$-$C_2$ stream 309 is fed to power plant 310 for producing electricity 311. $H_2$ stream 313 is fed to the DCL and upgrading system for reaction with coal feed 306. Stream 314 is an emission $CO_2$ stream from the SMR. While the SMR produces $CO_2$ emissions, the extra hydrogen produced in the SMR and fed to the DCL and upgrading system 305 enables more DCL production and, thus, higher plant output. Bottoms 308 from the DCL and upgrading can be sent to gasification for production of syngas, blended with coal to a power plant, fuel for a cement plant, or used for road paving. Operating an SMR using effluent $C_1$-$C_2$ to produce extra $H_2$ which significantly enables the production of more liquid products. $CO_2$ emissions can be captured and sequestered.

According to an embodiment, a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein the direct conversion and upgrading process produces $C_1$-$C_2$ byproduct which is fed to a steam methane reformer to produce hydrogen, wherein the hydrogen produced in the steam methane reformer is recycled as feed to the direct conversion and upgrading process, and wherein the direct conversion and upgrading process produces $C_3$-$C_4$ which is fed to partial oxidation or steam methane reforming for forming additional hydrogen that is also fed to the direct conversion and upgrading process.

Figure 4:
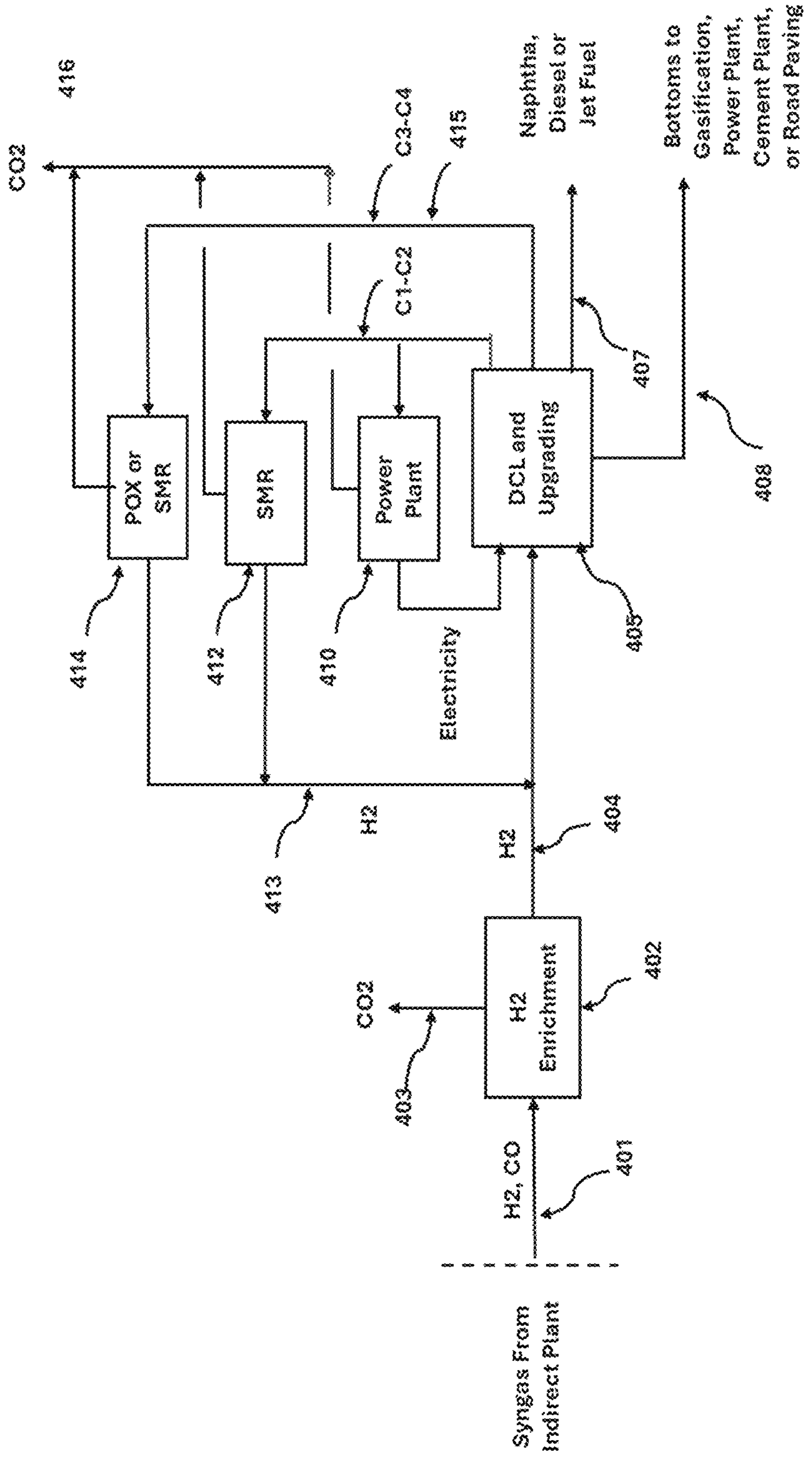
FIG. 4 is a schematic diagram of an alternative embodiment that allows for further increased plant output.

As shown in FIG. 4, syngas 401 from the syngas generator of the Indirect Process is treated to increase the $H_2$ content thereof (hydrogen enrichment) 402. This produces a hydrogen-rich stream 404 which is fed to the reactor system (not shown) of DCL and upgrading 405. Carbonaceous feed is also fed to a reactor system (not shown) of the DCL and upgrading wherein it is reacted with hydrogen 404 and 413, solvent and catalyst to produce liquid effluent for upgrading (not shown) to desired products. The DCL and upgrading produces $C_3$-$C_4$ (LPG) gases 415 which are fed to known partial oxidation (POX) or SMR 414 for conversion to additional hydrogen for feeding to the DCL and upgrading system which significantly increases the production of more valuable liquid products from the plant. POX can be accomplished by any known process. For example, stream 415 can be reacted with a limited amount of oxygen at high temperature to produce syngas, followed by removal of contaminants, subjected to a shift reaction and further contaminant removal to increase the hydrogen content. By providing additional hydrogen for reaction in the DCL and upgrading, plant output can be further increased. The DCL and upgrading also produces $C_1$-$C_2$ gas which is fed to a steam methane reformer 412 (SMR) for conversion to $H_2$. $H_2$ stream from the SMR is also fed to the DCL and upgrading for reaction with carbonaceous feed. 416 is $CO_2$ emissions from the SMR and POX which can be captured and sequestered. The extra hydrogen produced enables more DCL production and, thus, higher plant output. According to an embodiment, a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein the direct conversion and upgrading process produces $C_1$-$C_2$ byproduct which is fed to a steam methane reformer to produce hydrogen, wherein the hydrogen produced in the steam methane reformer is recycled as feed to the direct conversion and upgrading process, wherein the direct conversion and upgrading process produces $C_3$-$C_4$ which is fed to partial oxidation or steam methane reforming for forming additional hydrogen that is also fed to the direct conversion and upgrading process, and wherein the direct conversion and upgrading process also produces bottoms which are fed to second partial oxidation for forming additional hydrogen that is also fed to the direct conversion and upgrading process.

Figure 5:
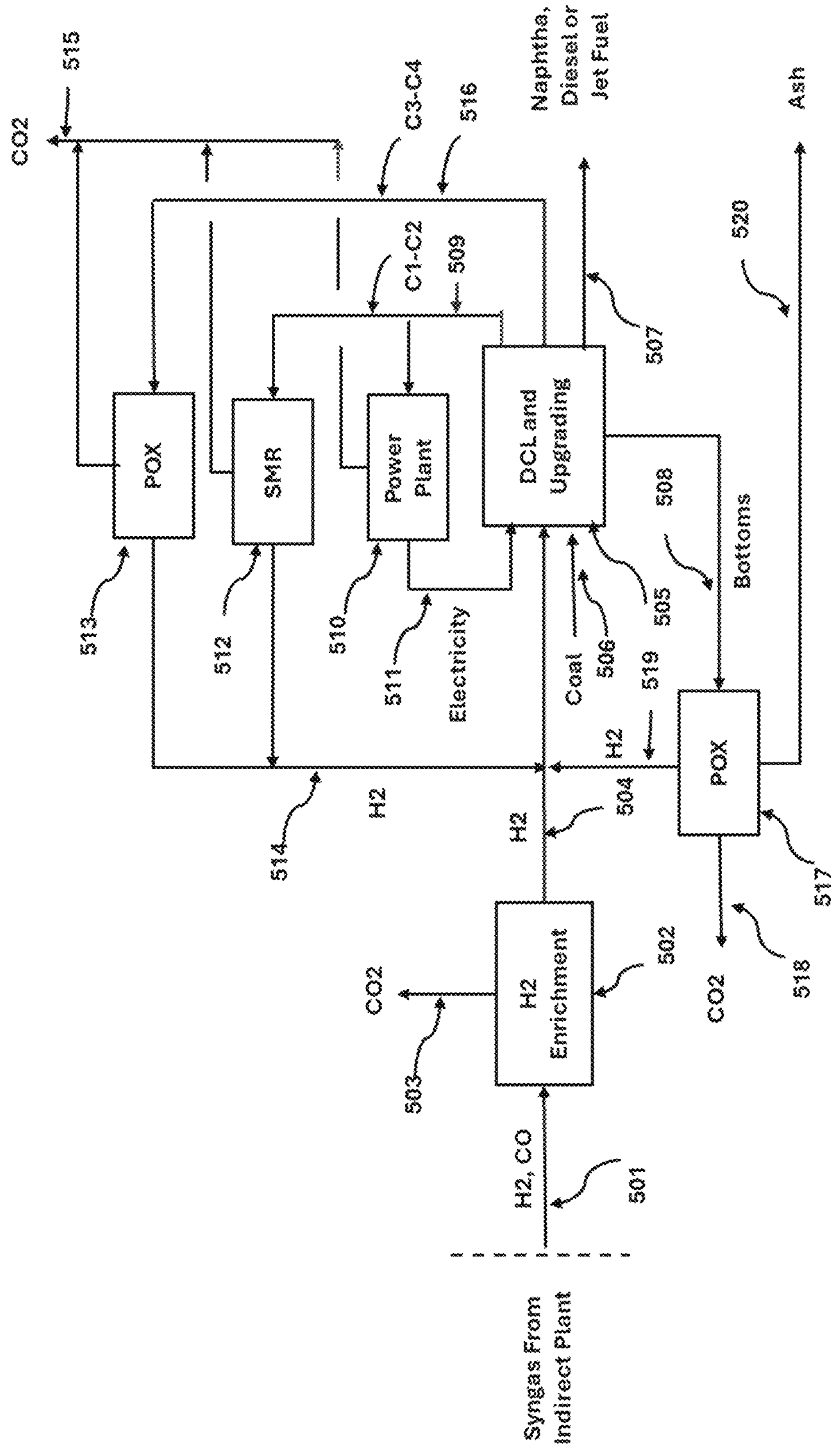
FIG. 5 is a schematic diagram of an alternative embodiment that allows for maximum plant output.

As shown in FIG. 5, the operation thereof is essentially the same as shown in FIG. 4 but with the feeding of bottoms 508 that are fed to second partial oxidation 517 for the production of additional hydrogen 519 that is also fed to the DCL and upgrading process 505.

According to an embodiment a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein at least one of germanium, molybdenum and rare earth metals are recovered as byproduct from the process.

Germanium is a trace metal found in coal fly ash, a byproduct of coal combustion. It has many known uses including, by way of example, in catalysis, infrared optics, electronics, fiber optics, fluorescent lamps, LEDs, semiconductors and solar products. The recovery of Ge can be carried out through the typical extraction methods by mining facilities (pyro- and hydrometallurgy). In general, after physical separation or pyro- and hydrometallurgical processes, a concentrate of Ge with around 30% content is obtained. The Ge concentrate, regardless of its source, is chlorinated, distilled, and purified. Molybdenum is another trace metal found in coal fly ash. Molybdenum (Mo) is used to produce high tensile strength steel. It is also used as a biocatalyst for plants and animals and is widely used in the manufacture of super alloys, lubricants, and electronic products. It can be recovered from fly ash, for example, by digestion of the fly ash using concentrated HCl and $HNO_3$, diluting the solution using HCl, and selectively extracting Mo from the solution using dithiocarbamate. Rare earth metals are critical to industry and have numerous applications, including, by way of example, permanent magnets, catalysts, polishes, metallurgy/alloys, batteries, and glass. Individual rare earths are used in different applications. Self-driving cars, magnetic cooling systems, and drones or civil aircraft for freight and passenger transport also require rare earth. Rare earth metals can be recovered as byproduct from fly ash using known methods as disclosed, for example, in U.S. Pat. Nos. 11,279,988 and 11,866,804. Germanium, molybdenum, and rare earth metals can be recovered from the bottoms stream of any of the embodiments depicted herein (not shown).

According to another embodiment, a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process, wherein $CO_2$ is produced that is captured and sequestered using biomass.

It is known that biomass can be used to capture $CO_2$. For example, the use of algae is disclosed in U.S. Pat. No. 9,234,139B2, US20070048848, and US20070048859. Also, for example, Accelergy Corporation has developed its TerraSync™ process according to which: " . . . CO2 is used as a vital feedstock for the cultivation of algae that are integral to TerraSync™ biofertilizer. Select, local native algae strains are isolated, cultivated and incorporated into proprietary blends of bio-fertilizer, which replace conventional chemical nitrogen fertilizers. TerraSync™ biofertilizer is applied as a live biofertilizer that biologically extracts (fixes) inert nitrogen (N) from the atmosphere and releases it in a form usable by crops. Once applied, TerraSync™ biofertilizer powers its metabolism, growth and nitrogen fixing capability by photosynthetically extracting $CO_2$ directly from the atmosphere to create simple carbon compounds which are excreted to the soil and used by the crops and the micro flora in the soil. A portion of these excreted compounds or their metabolites remain in the soil to increase its overall carbon content for many years. For every ton of $CO_2$ utilized in the original cultivation of algae, many additional tons of $CO_2$ are removed from the atmosphere on a life cycle basis. The leveraging effect of the process yields a profitable terrestrial $CO_2$ sequestration solution which allows our processed liquids to meet low carbon fuel requirements."

According to another embodiment, a process comprises:

a. modifying an indirect conversion process that comprises a syngas generation step and a product synthesis step by eliminating the product synthesis step;
b. feeding first carbonaceous feed to the syngas generation step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof; and
d. feeding the hydrogen-rich feedstream as feed to a direct conversion and upgrading process wherein a portion of the hydrogen-rich feedstream is used to generate power.

Figure 6:
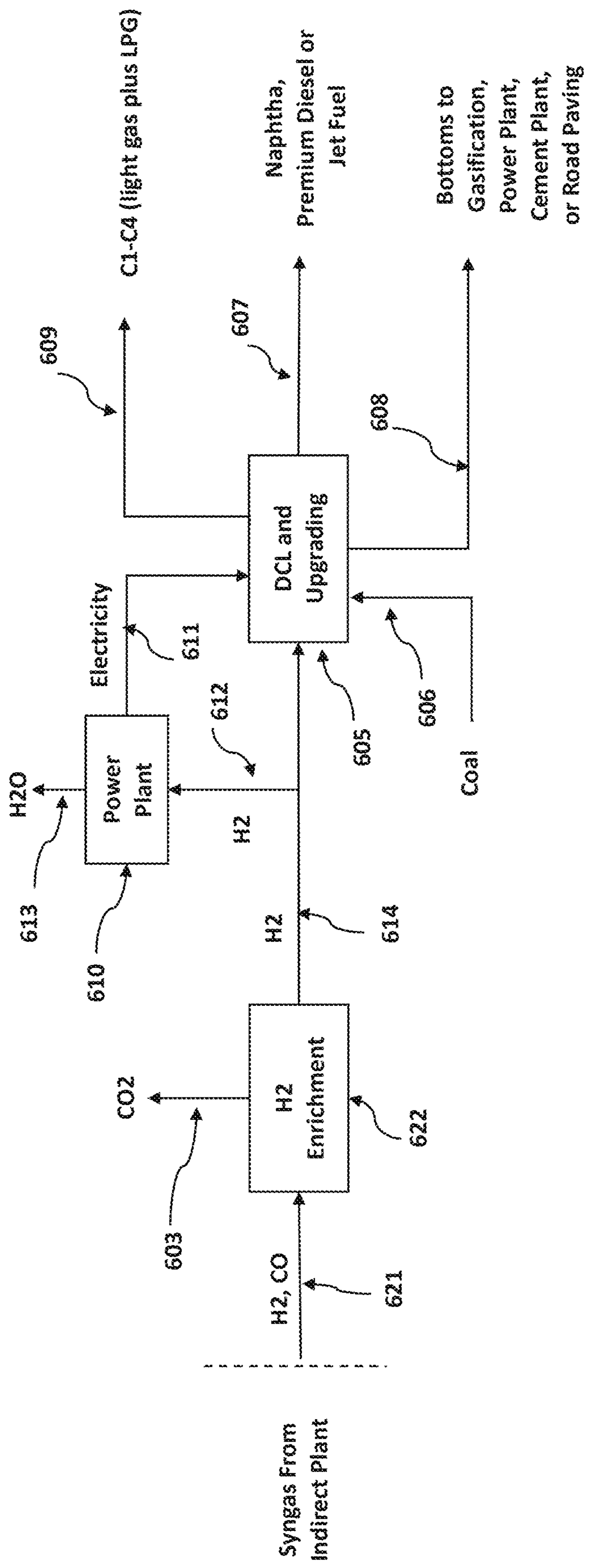
FIG. 6 is a schematic diagram of an alternative embodiment that allows for low $CO_2$ emissions.

As illustrated in FIG. 6, syngas 621 from the Indirect Process from which the product synthesis step (e.g., Fischer-Tropsch) has been eliminated is fed to $H_2$ Enrichment 622. As contrasted to the hybrid system illustrated in FIG. 1, the product synthesis step (Fischer-Tropsch) is eliminated in FIG. 6. "Elimination" can be accomplished by any known means such as, for example, bypassing or removing the existing F-T step. Also as contrasted to the hybrid prior art process illustrated in FIG. 1 in which the F-T step requires syngas that has been treated to increase the $H_2$ and CO content thereof, as shown at 622 in FIG. 6, the syngas from the syngas generator is treated to increase the $H_2$ content thereof ($H_2$ enrichment) 622 by any known method such as, by way of nonlimiting example, water-gas shift reaction with $CO_2$ scrubbing or pressure swing adsorption. This produces hydrogen-rich stream 614 (as contrasted with the hydrogen- and carbon monoxide-rich stream of FIG. 1) which, as shown by way of nonlimiting illustration, is split into a stream 612 to known hydrogen power generation 610, and feed to a reactor system (not shown) of DCL and upgrading 605. Coal 606 is also fed to a reactor system (not shown) in the DCL and upgrading wherein it is reacted with hydrogen, solvent and catalyst to produce liquid effluent for upgrading to desired products, for example, high density jet fuel. By way of nonlimiting example, the DCL and upgrading produces $C_1$-$C_4$ light gases plus liquified petroleum gas (LPG) in a first recovery stream 609 and naphtha, premium diesel or jet fuel in a second recovery stream 607. The distillate products meet the specifications of zero sulfur arctic diesel.

It is an option according to another embodiment to control the upgrading operating conditions (such conditions are known) to produce chemical products such as aromatics in addition to or instead of fuels.

In the DCL and upgrading, coal is typically slurried with a process derived solvent and pumped up to operating pressure. Typically, the slurry is heated to operating conditions via a heat exchanger or a fired furnace. The heat for heat exchange is typically provided by the heat of reaction during coal liquefaction. In some processes, additional heat is released within the process by the preparation of partially hydrogenated solvent (donor solvent) and/or during the upgrading of the liquefaction products to remove Sulfur, nitrogen, and oxygen.

Slurry preheat furnaces are used in many patented processes. They are required because the temperature of the mixed slurry is limited because of low proportion of hot process derived solvent relative to the quantity of ambient temperature coal. In addition, processes utilizing a donor solvent and/or a low activity catalyst require preheat to temperatures approaching liquefaction conditions to initiate the liquefaction reaction. The combination of these factors results in a requirement for large expensive, preheat furnaces.

An additional problem with the use of slurry preheat furnaces is discussed in "Upgrading of Coal Derived Oil by Integrating Hydrotreatment to the Primary Liquefaction Step" by Graeser, et. al., where it is stated that a fired slurry pretreater system "was very sensitive against deposit and coke formation, especially at the high temperature prevailing in the preheater tubes.

The DCL and upgrading embodiment described as follows achieves high coal conversion and liquid yields without the need for either slurry heat exchangers or a slurry preheat furnace. All heat input to liquefaction, as illustrated in FIG. 7, is achieved by recycle of atmospheric pipestill (APS) bottoms and vacuum gas oil (VGO) and a hydrogen treat gas heat exchanger and preheat furnace.

According to another embodiment, a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof;
d. feeding the hydrogen-rich feedstream as feed to a direct conversion and upgrading process for producing hydrocarbon products,
e. separating Such hydrocarbon products into different boiling point fractions, including a nominal 650 F.+ (343° C.+) fraction;
f. separating a portion of said 650° F.−−(343° C.−−) fraction into nominal 650° F. to 1000° F. (343° C. to 538° C.) and 1000 F+(538° C.+) fractions;
g. mixing a portion of said 650 F.−−(343° C.−−) fraction and at least a portion of said 1000 F−(538° C.−) fraction with said solid carbonaceous material to form a slurry;
h. pumping said slurry to the input of said direct liquefaction reactor with substantially no further heating of the portion of the slurry produced by the liquefaction reactor beyond that which occurred in the liquefaction reactor before being fed to the input to said reactor; and
i. combining said pumped slurry with hydrogen that has been heated to temperature such that the temperature of the combined slurry and hydrogen being fed to the input of the direct liquefaction reactor to at least about 660° F. (349° C.).

Figure 7:
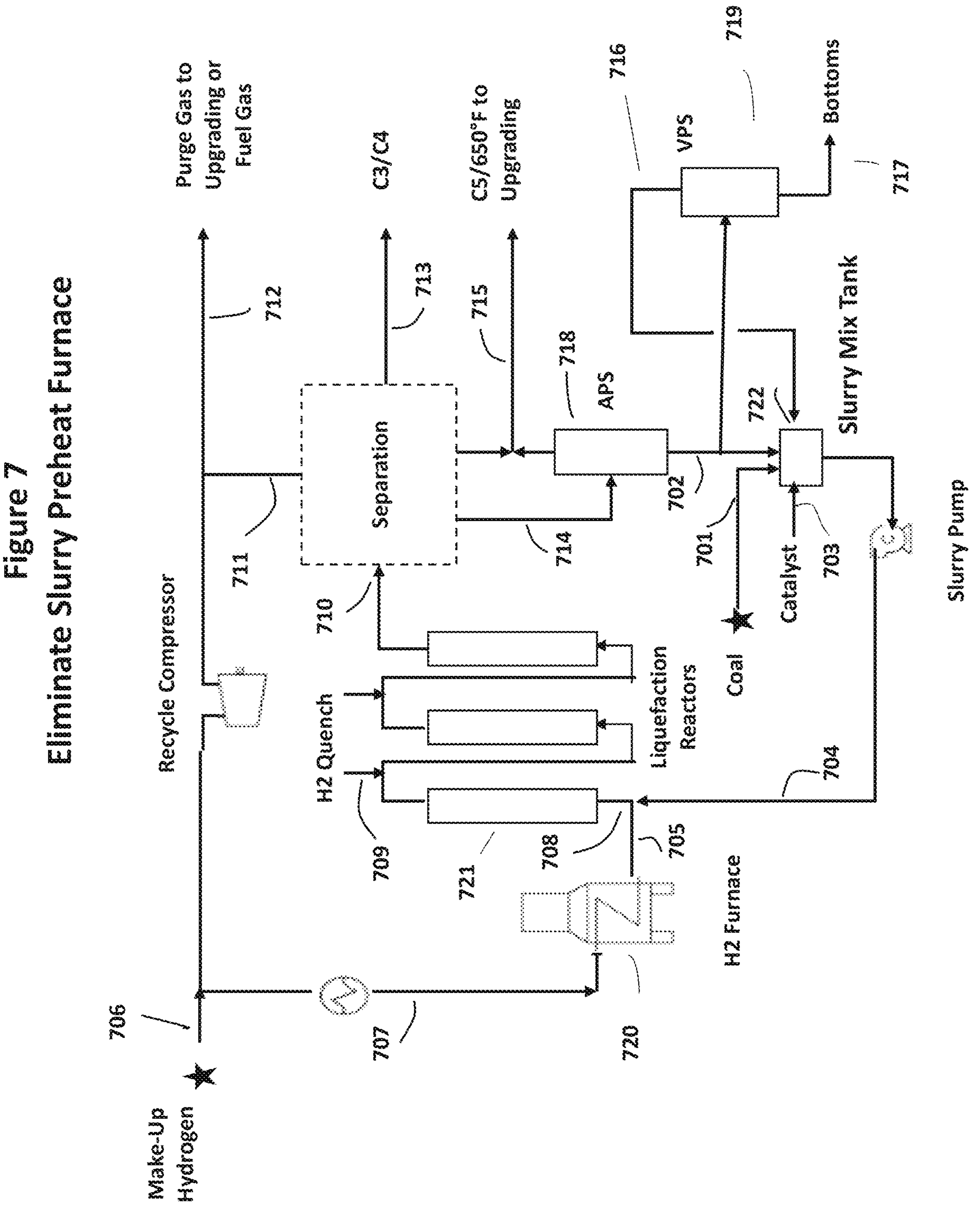
FIG. 7 is a schematic diagram of an embodiment that allows for elimination of the slurry preheater for the Direct Liquifaction Process.

According to FIG. 7, The coal feed is dried and crushed in a conventional gas swept roller mill (not shown) to a moisture content of 1 to 4%. The crushed and dried coal 701 and a dispersed catalyst 703 are fed into a slurry mixing tank where they are mixed with a 600 to 700° F.+(316 to 371° C.+)(nominally 650 F.+) fraction 702 from the APS and optionally a portion of the bottoms 717 from the VPS 719 (also referred to more generally as atmospheric and vacuum fractionators, respectively) and with VGO from line 716 to form a slurry stream. The catalyst in the illustrated embodiment is preferably in the form of a 2-10% aqueous water solution of phosphomolybdic acid (PMA) in an amount that is equivalent to adding between 50 wppm and 2% molybdenum relative to the dry coal feed. In the slurry mix tank 72, the contents are agitated for about 10 to 100 minutes and preferably for 20 to 60 minutes at an agitator speed defined a priori as a function of the slurry rheology. The slurry mix tank operating temperature is set by controlling the relative amounts of the nominal 650 F.+ fraction 702 from the APS, VPS bottoms 717, and VGO 716 being fed thereto. Typical operating temperature ranges from 500 to 700° F. (260 to 371° C.) and more preferably about 600° F. (316° C.). From the slurry mix tank, the catalyst containing slurry is delivered to the slurry pump. The selection of the appropriate mixing conditions is based on experimental work quantifying the rheological properties of the specific slurry blend being processed.

In the illustrated embodiment, the slurry leaves the mixing tank at about 600° F. (316° C.). Most of the remaining moisture in the coal is driven off in the mixing tank due to the hot bottoms being fed thereto. Such moisture and volatiles are sent to separation. The coal in the slurry leaving the slurry mixing tank has about 0.1 to 1.0% moisture. The coal slurry is pumped from the mixing tank and the pressure raised to about 2,000 to 3,000 psig (138 to 206 kg/cm g) by the slurry pump. The resulting high pressure slurry is mixed with preheated hydrogen rich treat gas. The hydrogen treat gas is preheated in heat exchanger and, if necessary, in preheat furnace 720. Heat for the hydrogen exchanger comes from the overhead from hot separator (not shown). The coal slurry and hydrogen mixture is fed to the input 705 of the first stage of the series-connected liquefaction reactors at about 660 to 700° F. (349 to 371° C.) and 2,000 to 3,000 psig (138 to 206 kg/cmg). The reactors are up-flow tubular vessels, the total length of the three reactors being 50 to 250 feet. The temperature rises from one reactor stage to the next as a result of the highly exothermic coal liquefaction reactions. In order to maintain the maximum temperature in each stage below about 800 to 900° F. (427 to 482° C.), additional hydrogen treat gas 709 is preferably injected between reactor stages. The hydrogen partial pressure in each stage is preferably maintained at a minimum of about 1,000 to 2,000 psig (69 to 138 kg/cmg). The effluent from the last stage of liquefaction reactor 710 is fed to the hot separator (not shown) in which it is separated into a gas stream and a liquid/solid stream. The gas stream is sent to the heat exchanger in which it serves, together with the hydrogen furnace 720, to preheat the hydrogen being fed to the liquefaction reactors. The liquid/solid stream from the hot separator is let down in pressure and fed to the APS 718 by feed line 714. After passing through the heat exchanger, the gas stream from the hot separator is cooled in heat exchanger (not shown) and fed to the cold separator (not shown) to condense out the liquid vapors of naphtha, distillate, and solvent and processed to remove HS and CO. Most of the remaining processed gas from the cold separator is then sent to ta hydrogen recovery system for further processing by conventional means to recover the hydrogen contained therein, which is then recycled via the heat exchanger and the hydrogen furnace 720 to be mixed with the coal slurry. The remaining portion of the processed gas is purged to prevent buildup of light ends in the recycle loop. Hydrogen recovered therefrom can be used in the downstream hydroprocessing upgrading system. Make-up hydrogen is added on line 706 to maintain an adequate hydrogen partial pressure in the liquefaction reactors. The depressurized liquid/solid stream and the hydrocarbons condensed during the gas cooling are sent to the APS 718 where they are separated into light ends, naphtha, distillate and bottoms fractions. The light ends are processed to recover hydrogen and C—C hydrocarbons that can be used for fuel gas and other purposes. The naphtha is hydrotreated to saturate diolefins and other reactive hydrocarbon compounds. The 160° F.+ fraction of the naphtha can be hydrotreated and catalytically reformed to produce gasoline. The distillate fraction can be hydrotreated to produce products such as diesel and jet fuel. A portion of the 600 to 700° F.+(316 to 3.71° C.+)(nominally, 650 F.+(343° C.+)) fraction is recycled to the slurry mix tank. The 600 to 700° F.–(316 to 3.71° C.+)(nominally, 650° F.+(343° C.+)) light ends, naphtha and distillate fractions are taken off the APS 718. The remaining nominal 650 F.+(343° C.+) fraction produced from the atmospheric fractionator is fed to the VPS wherein it is separated into a nominal 650 to 950/1100° F. (343 to 510/593° C.) VGO fraction and a 950/1100° F.+(510/593° C.+) bottoms fraction (nominally 650 to 1000° F. (343 to 538° C.) and 1000 F+(538° C.+)fractions). At least a portion of the VGO fraction is added to the nominal 650 F.+(343° C.+) stream from the APS being recycled to the slurry mix tank. Depending on the ash content of the coal being processed, a portion of the bottoms fraction from the VPS can sent to the slurry mix tank for being recycled to the first stage of the liquefaction reactor. This has the advantage that the catalyst entrained in such recycled bottoms is also thereby recycled to the reactor. Some or all of the VPS bottoms are sent to remove ash from the system and used to generate hydrogen, for road paving, or as fuel in a cement plant. The APS is preferably operated at a high enough pressure so that a portion of the nominal 650 F+(343° C.+) fraction can be recycled to the slurry mixing tank without pumping. Additional hydrogen for the process can also be produced via steam reforming of natural gas or via gasification of coal.

According to another embodiment, a process comprises:

a. modifying an indirect conversion process that comprises a syngas generation step and a product synthesis step by eliminating the product synthesis step;
b. feeding first carbonaceous feed to the gasification step of the indirect conversion process wherein it is converted into syngas that comprises $H_2$ and additionally at least one of $N_2$, $CO_2$ and CO;
c. treating the syngas to produce a hydrogen-rich feedstream by increasing the hydrogen content thereof;
d. feeding the hydrogen-rich feedstream as feed to a direct conversion and upgrading process, wherein the direct conversion process produces an aromatic liquid product comprising heteroatoms of S, N, and O, wherein the liquid product is fed to an upgrading reactor system wherein it is reacted with a hydrogen-rich feedstream in a reactor system comprising multiple fixed bed reactors containing hydrotreating or hydrocracking catalyst, wherein a first fixed bed reactor converts the heteroatoms of S, N, and O into $H_2S$, $H_2O$, and $NH_3$ which are fed to a second reactor to remove any residual S, O, and N compounds and partially convert aromatic compounds to naphthenes, wherein effluent from the second reactor enters a fractionator where $H_2S$, $H_2O$, $NH_3$, LPG, and naphtha are separated from the second stage effluent, and wherein material boiling above naphtha is hydrogenated in a third reactor where aromatics are converted to naphthenes and cracked to naphtha and lower boiling products.

Naphtha from the liquefaction step can be processed either in a separate hydrotreater or included in the feedstock to the hydrocracker for removal of heteroatoms. The S, O, and N free naphtha fraction can then be sent to a catalytic reformer for conversion to $C_6$ to $C_8$ aromatics which are used as a chemical plant feedstock.

According to another embodiment, a process comprises:

a. feeding first carbonaceous feed to an indirect conversion process that comprises a syngas generation step that converts the first carbonaceous feed into syngas that comprises $H_2$ and additionally at least one of $CO_2$, $N_2$ and CO and a product synthesis step;

b. modifying the indirect conversion process by feeding a first portion of the syngas as feed to the product synthesis step wherein first liquid products are produced and feeding a second portion of the syngas to hydrogen enrichment to produce a hydrogen-rich feedstream by increasing the hydrogen content thereof; and c. feeding the hydrogen-rich feedstream as feed to a direct conversion and upgrading process wherein second liquid products are produced.

Figure 8:
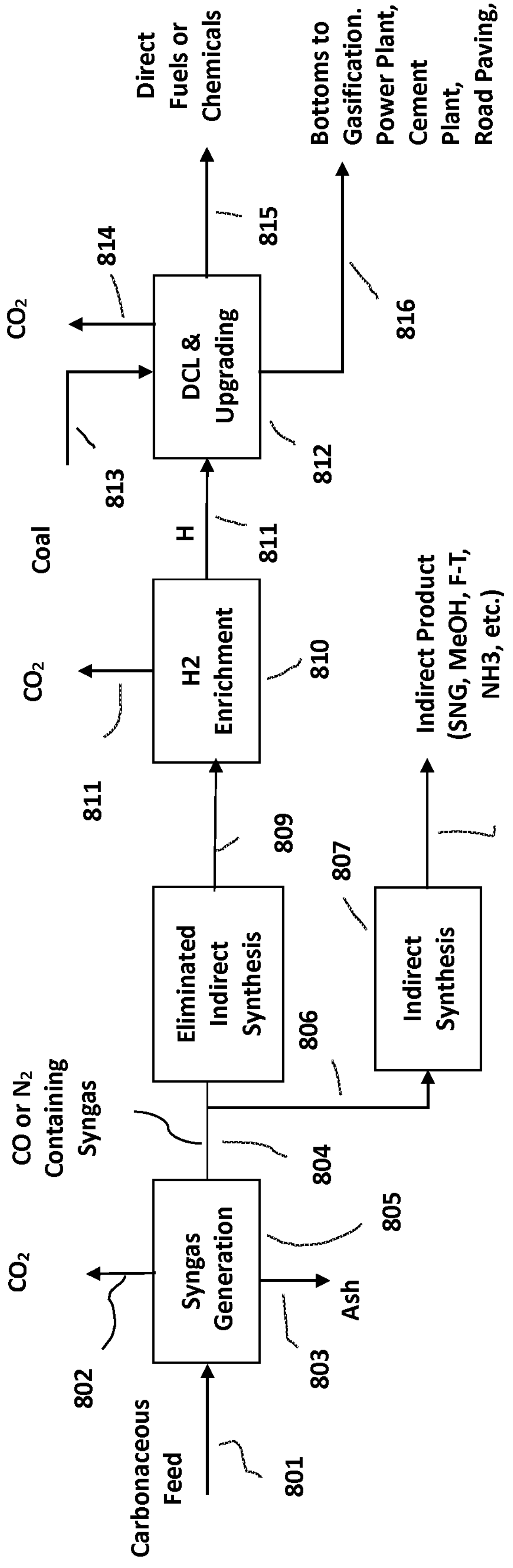
FIG. 8 is a schematic diagram of an embodiment illustrating a split stream of syngas from the indirect conversion process.

As shown in FIG. 8, syngas 804 from syngas generation 805 is split into a first portion 806 that is fed to indirect synthesis (e.g., Fischer-Tropsch) wherein first liquid products are produced, by way of nonlimiting example, SNG MeOH or $NH_3$. The remaining portion of syngas 804 is fed to enrichment section 810, bypassing indirect synthesis 807 to produce second liquid products 815 and bottoms 816. This enables taking advantage of increased production resulting from elimination of indirect synthesis (shown in the dotted box in FIG. 8) as illustrated, for example, in Table 2 below, and provides flexibility in products produced.

EXAMPLES

The following comparisons and demonstrations were conducted by computer simulation.

Example 1

Table 1 below compares the productivity of a prior art indirect coal liquifaction plant processing 3,441 thousand tons of coal per year to a hybrid indirect to direct coal liquifaction plant according to the present invention on the basis of coal processed, product produced and $CO_2$ emissions.

TABLE 1

| Item | DCL /F-T[2] | CTL F-T[3] | Delta[4] |
|---|---|---|---|
| AR Coal, kta[1] | 3441 | 3441 | 0 |
| DCL Coal, kta | 4458 | 0 | 4458 |
| Total AR coal, kta | 7899 | 3441 | 4458 |
| Products | | | |
| C1-C2 | 261 | 0 | 261 |
| LPG | 276 | 87 | 189 |
| Naptha | 536 | 226 | 310 |
| Diesel | 1993 | 687 | 1306 |
| Total | 3066 | 1000 | 2066 |
| Bottoms Sales | 769 | | 769 |
| Total | 3835 | 1000 | 2835 |
| CO2 Emissions, kta | 11587 | 4930 | 6657 |
| Tons CO2/ton products | 3.78[5] | 4.93 | 3.22 |
| Tons Coal/ton Products | 2.58[6] | 3.44 | 2.16 |

Footnotes:
[1]As received coal processed in the Indirect Plant thousand tons per year.
[2]Hybrid indirect (Fischer-Tropsch) plant to direct plant.
[3]Stand-alone indirect plant (CTL)
[4]Difference between footnote 1 and footnote 2 plants.
[5]Values obtained by dividing CO2 emissions by total product ex-bottoms.
[6]Values obtained by dividing AR coal by total products produced ex-bottoms.

As can be seen from the above Table 1, while the hybrid indirect to direct plant allowed for the processing of 2.3 times more AR coal (7899/3441) it surprisingly allowed for 3.1 times more product produced (3066/1000). The $CO_2$ emissions, on basis of tons of $CO_2$ per ton of products produced was considerably less for the hybrid plant

Example 2

The following Table 2 compares the performance of a stand-alone Indirect Coal Liquifaction plant processing 3441 thousand tons per annum of coal to various hybrid plant embodiments described herein as referenced to FIGS. 2-5 of the drawings

TABLE 2

| Item | CTL[1] (F-T) | DCL[2] (MCL) | | | |
|---|---|---|---|---|---|
| FIG. | | 2 | 3 | 4 | 5 |
| Source of H2 | | F-T | F-T Plus C1-C2 | F-T Plus C1-C4 | F-T, C1-C4 & Bottoms |
| AR Coal, kta[3] | 3,441 | 3,441 | 3,441 | 3,441 | 3,441 |
| DCL Coal, kta | | 4,458 | 5,790 | 8,105 | 15,920 |
| Total AR coal, kta | | 7,899 | 9,231 | 11,546 | 19,361 |
| Products | | | | | |
| C1-C2 | — | 261 | — | — | — |
| LPG | 87 | 276 | 358 | — | — |
| Naptha | 226 | 536 | 697 | 976 | 1,918 |
| Diesel | 687 | 1,993 | 2,588 | 3,624 | 7,117 |
| Total | 1,000 | 3,066 | 3,643 | 4,600 | 9,035 |
| Bottoms Sales | | 769 | 999 | 1,398 | — |
| Total | 1,000 | 3,835 | 4,642 | 5,998 | 9,035 |
| CO2 Emissions, kta[4] | 4930 | 11,587 | 13,318 | 16,472 | 23,381 |
| Relative Investment, % | | 65.1 | 70.6 | 75.0 | 82.8 |
| Tons CO2/ton products | 4.93[5] | 3.78 | 3.66 | 3.58 | 2.59 |
| Tons Coal/ton Products | 3.44[6] | 2.58 | 2.53 | 2.51 | 2.14 |

Footnotes:
[1]Stand-alone Indirect Coal Liquifaction Plant that converts coal to syngas via gasification and production of products by Fischer-Tropsch reaction.
[2]Various combination Indirect to Direct Liquifaction Plants according to the embodiments indicated in FIGs. 2-5.
[3]As Received Coal.
[4]Units in thousand tons per year (annum).
[5]Values obtained by dividing CO2 emissions by total product ex-bottoms.
[6]Values obtained by dividing AR coal by total products produced ex-bottoms.

As can be seen from the above Table 2, for example comparing the CTL stand-alone Indirect Plant to the FIG. 2 embodiment Plant, while the FIG. 2 Plant is able to process 2.3 times (7899/3441) more AR coal, the total product produced was 3.1 (3066/1000) times more, a surprising result. The FIG. 3 Plant can process 2.7 more AR coal and produced 3.6 times more product. The FIG. 4 embodiment Plant could process 3.4 time more AR coal but produced 4.6 time more product. Similarly, the FIG. 5 embodiment Plant can process 5.6 times more AR coal but produced 9 time more product.

For one skilled in the art, it is well known that Direct Coal Liquefaction will produce 50 percent more barrels of fuel than an Indirect Coal Liquefaction process such as Fischer-Tropsch. It was surprising to find that three times the fuel product could be produced in this invention using syngas from an existing Fischer-Tropsch plant. It was equally surprising to discover that if the $C_1$-$C_4$ and bottoms produced in the DCL plant were also converted to hydrogen, nine times more fuel product could be produced containing 79 percent diesel or jet fuel and more than an additional 60 percent added to the life of coal reserves. It is also worth noting that the quantity of syngas produced in a process is directly proportional to the quantity of product and not the feed to the syngas generation step; thus, this discovery would apply directly to a plant feeding natural gas to the syngas generation process but $CO_2$ emissions from the synthesis step would be lower from natural gas than coal.

Example 3

The following Table demonstrates the ability of the present hybrid system to allow for operation at zero net $CO_2$ emissions by eliminating the $CO_2$ emissions of a prior art indirect coal liquifaction plant processing 3,441 thousand tons of coal per year according to the present invention.

TABLE 3

| | |
|---|---|
| F-T connverted to syngas | |
| F-T | 1,000 kta |
| $CO_2$ emissions saved | 4,930 kta |
| If $CO_2$ savings offset by equal quantity of $CO_2$ emissions | |
| Net $CO_2$ emissions zero | |
| DCL Figure 2 emissions | 12,358 kta[1] |
| Offset F-T savings | 4,930 kta |
| Percent of FIG. 2 | 40% |
| Product produced at 40% | |
| C1- | |
| Diesel | 1226 kta |
| Bottoms | 308 kta |
| Total | 1,544 kta |

Footenote:
[1]Capacity of DCL plant to achieve zero net $CO_2$ emissions.

Table 3 presents an example where the $CO_2$ emissions from a Fischer-Tropsch plant were eliminated and the saved emissions were utilized in a DCL plant producing the same $CO_2$ emissions; thus, maintaining the overall $CO_2$ emissions constant.

What is claimed is:

1. A process comprising:

a. modifying an indirect conversion process that comprises a syngas generation step and a product synthesis step by eliminating the product synthesis step;

b. feeding a first carbonaceous feed to the syngas generation step of the indirect conversion process wherein it is converted into syngas that comprises CO, $H_2$ and additionally at least one of $N_2$ and $CO_2$;

c. treating the syngas to produce a hydrogen-rich feedstream by increasing the hydrogen content thereof; and d. feeding the hydrogen-rich feedstream as feed to a direct conversion and upgrading process, wherein the direct conversion and upgrading process comprises reacting the hydrogen-rich feedstream with a second carbonaceous feed in the presence of a catalyst to produce liquids.

2. The process of claim 1, wherein the produced liquids are upgraded to product.

3. The process of claim 2, wherein the upgraded product comprises naphthenic fuels.

4. The process of claim 2, wherein the upgraded product comprises jet fuel.

5. The process of claim 2, wherein the upgraded product comprises diesel fuel.

6. The process of claim 2, wherein the upgraded product comprises naphthenic fuels containing at least 80 percent naphthenes based on volume.

7. The process of claim 2, wherein the upgraded product comprises naphthenic fuels containing at least 90 percent naphthenes based on volume.

8. The process of claim 2, wherein the upgraded product comprises naphthenic fuels containing at least 95 percent naphthenes based on volume.

9. The process of claim 2, wherein the direct conversion and upgrading process produces aromatic hydrocarbons.

10. The process of claim 1, wherein the hydrogen-rich feedstream comprises at least 90% hydrogen based on volume.

11. The process of claim 1, wherein the hydrogen-rich feedstream comprises at least 95% hydrogen based on volume.

12. The process of claim 1 wherein the hydrogen-rich feedstream comprises at least 99% hydrogen based on volume.

13. The process of claim 1, wherein a second carbonaceous feed is fed to the direct conversion and upgrading process.

14. The process of claim 1, wherein the direct conversion and upgrading process is a direct liquefaction process comprising a liquefaction reactor system, and wherein the carbonaceous feed is reacted with the hydrogen-rich feedstream and catalyst to produce a liquefaction effluent.

15. The process of claim 14, wherein the liquefaction reactor system comprises plural reactors.

16. The process of claim 15, wherein an effluent from the liquefaction reactor system is fed to an upgrading reactor system wherein heteroatoms are removed and its final boiling point is adjusted.

17. The process of claim 16 wherein aromatics from the liquefaction reactor system are hydrogenated to naphthenes.

18. The process of claim 1, wherein the syngas from step b. is treated to remove contaminants comprising oxygen, sulfur, and nitrogen therefrom.

19. The process of claim 1, wherein the syngas from step c. is subjected to a water-gas shift reaction to increase the hydrogen content of the syngas and to convert the CO to $CO_2$.

20. The process of claim 19, wherein the $CO_2$ contained in the water-gas shift reaction product is removed therefrom.

21. The process of claim 1, wherein a portion of the hydrogen-rich feedstream is used to generate power.

22. The process of claim 1, wherein the direct conversion and upgrading process also produces byproduct $C_1$-$C_4$ light gas, which byproduct is used to generate power.

23. The process of claim 1, wherein the direct conversion and upgrading process also produces $C_1$-$C_2$ byproduct which is fed to a steam methane reformer to produce hydrogen.

24. The process of claim 23, wherein the hydrogen produced in the steam methane reformer is recycled as feed to the direct conversion and upgrading process.

25. The process of claim 1, wherein the direct conversion and upgrading process produces $C_3$-C4 and LPG which is fed to a first partial oxidation or steam methane reforming for forming a hydrogen stream that is fed to the direct conversion and upgrading process.

26. The process of claim 25, wherein the direct conversion and upgrading process also produces $C_1$-$C_2$ byproduct which is fed to a steam methane reformer to produce additional hydrogen which is recycled to the direct conversion and upgrading process.

27. The process of claim 26, wherein the direct conversion and upgrading process also produces bottoms which are fed to a second partial oxidation or steam methane reforming for forming additional hydrogen that is also fed to the direct conversion and upgrading process.

28. The process of claim 27, wherein a portion of the $C_1$-$C_2$ byproduct is used to generate power.

29. The process of claim 1, wherein $CO_2$ emissions are reduced by decreasing the production rate of the indirect conversion process.

30. The process of claim 1, wherein the hydrogen-rich feedstream is the only source of hydrogen to the direct conversion and upgrading process.

31. The process of claim 1, wherein the first carbonaceous feed comprises coal.

32. The process of claim 31, wherein germanium is recovered as byproduct from the process.

33. The process of claim 31, wherein molybdenum is recovered as byproduct from the process.

34. The process of claim 31, wherein rare earth metals are recovered as byproduct from the process.

35. The process of claim 1, wherein $CO_2$ is produced that is captured and sequestered.

36. The process of claim 35, wherein the $CO_2$ is captured using biomass.

37. The process of claim 36, wherein the biomass comprises algae.

38. The process of claim 1, wherein the syngas generation step comprises gasification.

39. A process comprising:

a. modifying an indirect conversion process that comprises a syngas generation step and a product synthesis step by eliminating the product synthesis step;

b. feeding a first carbonaceous feed to the syngas generation step of the indirect conversion process wherein it is converted into syngas that comprises CO, $H_2$ and additionally at least one of $N_2$ and $CO_2$;

c. treating the syngas to produce a hydrogen-rich feedstream by increasing the hydrogen content thereof; and d. feeding the hydrogen-rich feedstream as feed to a direct conversion and upgrading process, wherein the direct conversion and upgrading process comprises reacting the hydrogen-rich feedstream with a second carbonaceous feed in the presence of a catalyst to produce liquids, wherein the direct conversion process produces an aromatic liquid product that comprises heteroatoms of S, O, and N, wherein the liquid product is reacted with a hydrogen-rich feedstream in a reactor system comprising multiple fixed bed reactors containing a hydrotreating or hydrocracking catalyst, wherein a first fixed bed reactor converts the heteroatoms of S, N, and O into $H_2S$, $H_2O$, and $NH_3$ a second fixed bed reactor removes any residual S, O, and N compounds and partially converts aromatic compounds to naphthenes, wherein an effluent from the second reactor enters a fractionator where $H_2S$, $H_2O$, $NH_3$, LPG, and naphtha are separated from the second reactor effluent, wherein a material boiling above naphtha is hydrogenated in a third reactor where aromatics are converted to naphthenes which meet diesel and jet fuel specifications or converted to naphtha rich in naphthenes and aromatics.

40. A process comprising:

a. modifying an indirect conversion process that comprises a syngas generation step and a product synthesis step by eliminating the product synthesis step;

b. feeding a first carbonaceous feed to the gasification step of the indirect conversion process wherein it is converted into syngas that comprises CO, $H_2$ and additionally at least one of $N_2$ and $CO_2$;

c. treating the syngas to produce a hydrogen-rich feedstream by increasing the hydrogen content thereof;

d. feeding the hydrogen-rich feedstream as feed to a direct conversion and upgrading process for producing hydrocarbon products, wherein the direct conversion and upgrading process comprises reacting the hydrogen-rich feedstream with a second carbonaceous feed in the presence of a catalyst to produce liquids, e. separating such hydrocarbon products into different boiling point fractions, including a nominal 650 F.+ (343° C.+) fraction;

f. separating a portion of said 650 F.+(343° C.+) fraction into nominal 650° F. to 1000° F. (343° C. to 538° C.) and 1000 F+(538° C.+) fractions;

g. mixing a portion of said 650 F.+(343° C.+) fraction and at least a portion of said 650° F. to 1000° F. (343° C. to 538° C.) fraction with solid carbonaceous material to form a slurry;

h. pumping said slurry to an input of said direct liquefaction reactor with substantially no further heating of the slurry; and i. combining said pumped slurry with hydrogen that has been heated to temperature such that the temperature of the combined slurry and hydrogen being fed to the input of the direct liquefaction reactor to at least about 660° F. (349° C.).

41. The process of claim 40, wherein the effluent from the direct liquefaction reactor is separated into a gas stream and a liquid/solid stream, and further including heating the hydrogen being fed to the input of said liquefaction reactor by heat exchange with said gas stream.

42. The process of claim 41 including further heating the hydrogen being fed to the input of said liquefaction reactor in a furnace.

43. The process of claim 42, wherein said direct liquefaction reactor comprises a three or more-stage series connected adiabatic, slurry reactor, and further including controlling the temperatures of the reactor stages by supplying a hydrogen quench between the said reactor stages.

44. The process of claim 43, wherein the temperature of the combined slurry and hydrogen being fed to the input of the direct liquefaction reactor is between 660° and 700° F. (349 and 371° C.).

45. The process of claim 41, wherein said reactor includes a plurality of series connected reactor stages, and further including feeding a portion of said 650° F. to 1000° F. (343° C. 46 to 538° C.) fraction between said reactor stages as a quench.

46. A process comprising:

a. modifying an indirect conversion process that comprises a syngas generation step and a product synthesis step by eliminating the product synthesis step;

b. feeding a first carbonaceous feed to the syngas generation step of the indirect conversion process wherein it is converted into syngas that comprises CO, $H_2$ and additionally at least one of $N_2$ and $CO_2$;

c. treating the syngas to produce a hydrogen-rich feedstream by increasing the hydrogen content thereof; and d. feeding the hydrogen-rich feedstream as feed to a direct conversion and upgrading process, wherein the direct conversion and upgrading process comprises reacting the hydrogen-rich feedstream with a second carbonaceous feed in the presence of a catalyst to produce liquids, and wherein the operation of the indirect conversion process is reduced to reduce the $CO_2$ emissions therefrom.

47. The process of claim 46, wherein the operation of the indirect conversion process is reduced to substantially reduce the net $CO_2$ emissions to net zero.

* * * * *